(12) United States Patent
Timner et al.

(10) Patent No.: US 9,001,706 B2
(45) Date of Patent: *Apr. 7, 2015

(54) METHOD AND APPARATUS FOR IMPROVED DATA COMMUNICATION IN CELLULAR ACCESS SYSTEMS

(71) Applicant: Telefonaktiebolaget L M Ericsson (Publ), Stockholm (SE)

(72) Inventors: Ylva Timner, Luleå (SE); Mårten Sundberg, Årsta (SE); Håkan Persson, Solna (SE); Andreas Bergström, Vikingstad (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/090,540

(22) Filed: Nov. 26, 2013

(65) Prior Publication Data

US 2014/0219108 A1   Aug. 7, 2014

Related U.S. Application Data

(63) Continuation of application No. 13/411,903, filed on Mar. 5, 2012, now Pat. No. 8,630,210, which is a continuation of application No. 12/297,808, filed as application No. PCT/SE2007/050186 on Mar. 27, 2007, now Pat. No. 8,155,034.

(30) Foreign Application Priority Data

Apr. 19, 2006   (WO) .................. PCT/SE2006/050080
Feb. 7, 2007   (SE) ....................................... 0700311

(51) Int. Cl.
*H04B 7/005*   (2006.01)
*H04W 24/10*   (2009.01)

(Continued)

(52) U.S. Cl.
CPC ............. *H04W 24/10* (2013.01); *H04L 1/1607* (2013.01); *H04L 1/1664* (2013.01);
(Continued)

(58) Field of Classification Search
CPC ..... H04W 24/10; H04W 24/08; H04W 28/06; H04W 28/04; H04L 69/324; H04L 1/1664; H04L 1/1685; H04L 1/1607; H04L 1/1854
USPC ......... 370/278–282, 327, 340–343, 389, 394, 370/395.5; 455/24.39, 68, 69
See application file for complete search history.

(56) References Cited

U.S. PATENT DOCUMENTS 5,572,546 A   11/1996   Serfaty et al.
7,012,893 B2   3/2006   Bahadiroglu (Continued)

*Primary Examiner* — Ayaz Sheikh
*Assistant Examiner* — Mounir Moutaouakil

(57) ABSTRACT

A method for use in a cellular access system is disclosed. The system comprises at least one Radio Base Station (RBS) and a User Equipment (UE), which can send and receive data blocks to and from each other, comprising sequence numbers. The method, performed by a reporting party, comprises sending a transmission comprising a report to the report receiving party, said report comprising information on whether or not data blocks have been received successfully. The method further comprises sending said report together with data to the report receiving party or to another party. The method further comprises attaching addresses for a recipient of the data blocks and for the report in the transmission. The method further comprises deciding the contents of the report using at least one of a list of priority rules which have been given an internal priority ranking.

14 Claims, 3 Drawing Sheets

(51) Int. Cl.
*H04L 1/16* (2006.01)
*H04L 1/18* (2006.01)
*H04W 28/06* (2009.01)
*H04L 29/08* (2006.01)
*H04W 24/08* (2009.01)
*H04W 28/04* (2009.01)

(52) U.S. Cl.
CPC ......... *H04L 1/1685* (2013.01); *H04L 1/1854* (2013.01); *H04W 28/04* (2013.01); *H04W 28/06* (2013.01); *H04L 69/324* (2013.01); *H04W 24/08* (2013.01)

(56) References Cited

U.S. PATENT DOCUMENTS

| | | | |
|---|---|---|---|
| 7,848,330 B2 | 12/2010 | Nishibayashi et al. | |
| 8,204,002 B2 * | 6/2012 | Hole et al. | 370/328 |
| 8,204,003 B2 * | 6/2012 | Hole et al. | 370/328 |
| 8,457,048 B2 * | 6/2013 | Venkob et al. | 370/328 |
| 8,473,800 B2 * | 6/2013 | Axelsson et al. | 714/748 |
| 8,630,210 B2 * | 1/2014 | Timner et al. | 370/278 |
| 8,745,231 B2 * | 6/2014 | Hole et al. | 709/226 |
| 8,769,366 B2 * | 7/2014 | Axelsson et al. | 714/748 |
| 8,830,981 B2 * | 9/2014 | Hole et al. | 370/349 |
| 8,837,388 B2 * | 9/2014 | Hole et al. | 370/329 |
| 2005/0036497 A1 | 2/2005 | Kawakami | |
| 2005/0063392 A1 | 3/2005 | Ofujio et al. | |
| 2005/0207436 A1 | 9/2005 | Varma | |
| 2006/0067238 A1 | 3/2006 | Olsson et al. | |
| 2007/0217385 A1 | 9/2007 | Meier | |
| 2008/0034089 A1 | 2/2008 | Edwards et al. | |
| 2008/0037543 A1 | 2/2008 | Sala et al. | |
| 2008/0056303 A1 | 3/2008 | Sebire et al. | |
| 2008/0212508 A1 | 9/2008 | Morimoto et al. | |
| 2010/0265907 A1 | 10/2010 | Meier | |
| 2010/0309830 A1 | 12/2010 | Yi | |

* cited by examiner

METHOD AND APPARATUS FOR IMPROVED DATA COMMUNICATION IN CELLULAR ACCESS SYSTEMS

CROSS-REFERENCE TO RELATED APPLICATIONS

This application is a continuation of co-pending U.S. patent application Ser. No. 13/411,903 filed Mar. 5, 2012, which is a continuation of U.S. application Ser. No. 12/297,808, filed Oct. 20, 2008, which was the National Stage of International Application No. PCT/SE2007/050186, filed Mar. 27, 2007, which claims the benefit of International Application No. PCT/SE2006/050080, filed Apr. 19, 2006 and Swedish Application No. 0700311-4, filed Feb. 7, 2007, the disclosures of which are incorporated herein by reference in their entireties.

TECHNICAL FIELD

The invention discloses a method for use in a cellular access system, in which system there is at least one Radio Base Station, RBS, for the control of the traffic to and from a cell in the system, in which cell there can be a user with a User Equipment, UE. By means of the invention, improved performance of so called ACK/NACK reports can be obtained.

BACKGROUND

The current EDGE standard allows for two different Radio Link Control, RLC, modes of operation: acknowledged and un-acknowledged mode. In the un-acknowledged mode, data delays are kept at a minimum since there are no re-transmission delays, but bandwidth is wasted, since excessive channel coding must be used to guarantee acceptable Frame Error Rate, FER.

In the acknowledged mode on the other hand, data blocks are re-transmitted until correctly received, regardless of the delay requirements. Since the number of re-transmissions is unlimited, it is not possible to guarantee any maximum delay requirements by the acknowledged bearer. In addition, the transmission of the necessary control blocks containing the information regarding Acknowledge/Negative Acknowledge, ACK/NACK, may consume quite a large amount of bandwidth in the opposite direction, i.e. the "return" direction.

Within the framework of GERAN, GSM EDGE Radio Access Network, and Evolution in 3GPP, a non-persistent RLC operating mode, "NPM" mode, suitable for delay-critical services, will be included in the EDGE standard. This non-persistent mode is similar to the acknowledged mode operation, but with the difference that a timer is suggested for use in order to enforce a maximum allowed time from the reception of an RLC block until it must be delivered to the Logical Link Protocol, LLC, protocol layer above.

In current GERAN systems, the ACK/NACK information for acknowledged mode is sent in special control blocks, containing a starting sequence number and a bitmap representing radio blocks. The reporting strategy, e. g. how and when reports are sent etc., is controlled by the network. The mobile will send ACK/NACK information as a response to a poll from the base station. The poll will include information of when to send the control block, and the content of the report.

There are two reporting content possibilities, first partial bitmap, FPB, and next partial bitmap, NPB. An FPB report will start with the beginning of the receiver window, i.e. the oldest outstanding data block, while an NPB report starts at the point where the bitmap of the latest ACK/NACK report ended.

A drawback of the current ACK/NACK reporting protocols is that a full control block is needed every time ACK/NACK information is sent. Therefore the overhead will be large when frequent ACK/NACK information is needed for delay sensitive services.

Consequently, within the framework of GERAN Evolution in 3GPP, it has been suggested that a new ACK/NACK protocol should be introduced to GERAN. The suggestion is an event-based protocol that uses ACK/NACK messages that are "piggy-backed" on data packets in the opposite link direction. An event is defined as an error in the transmission detected by the receiver. This method has the potential to significantly reduce the re-transmission delay without significant overhead. International patent application PCT/SE 2006/050080 describes how these piggy-backed ACK/NACK Reports, "PANs", can be designed as a combination of Block Sequence Numbers, BSN, which specify outstanding radio blocks, bitmaps giving ACK/NACK information of radio blocks after a specified BSN, and size bits or extension bits specifying the size of the ACK/NACK information. This method allows for the sent ACK/NACK information to consist either of one single PAN or be split into several multiple segment PANs.

However, in some cases, neither the existing standard, proposed standard changes, nor the previous patent application mentioned above may give sufficient information regarding which part of the RLC window to cover by means of the PANS in order to obtain the best performance for services which employ acknowledge mode and/or non-persistent mode radio bearers.

When using an event-based RLC operating mode with Piggy-backed ACK/NACK-information, PAN, the following issue may become of interest:

The First Partial Bitmap, FPB, and Next Partial Bitmap, NPB, reporting strategies do not guarantee that the BSN number that identifies the RLC block causing the event will be included in the PAN. With e.g. FPB, this BSN will not be included in the PAN until it has reached the lower end (lowest BSNs) of the RLC window, thus causing retransmission delays to become significantly larger.

For the delay-sensitive kind of services that use non-persistent radio bearers, this not only induces heavier jitter but may also be so late that the NPM transfer timer has already discarded the RLC block, which in turn will increase the Frame Error Rate, FER. For acknowledged mode services, there may be a potential risk of stalling the RLC transmit window, which may deteriorate the system performance and throughput.

SUMMARY

As explained above, there is thus a need for a method by means of which systems that use event based "piggy backed" ACK/NACK reporting protocols of the type described above can be improved upon. Suitably, the method should be aimed at applications in cellular access systems.

This need is addressed by the present invention in that it provides a method for use in a cellular access system in which system there is at least one Radio Base Station, RBS, which controls the traffic to and from a cell in the system.

In the cell, there can be a user with a User Equipment, UE, and the RBS and the UE are able to send and receive data blocks, which may comprise sequence numbers, to and from each other.

The RBS and the UE also exchange reports comprising information on whether or not data blocks have been received successfully, so that both the UE and the RBS can be either the reporting party or the report receiving party.

The method of the invention further comprises:
letting the reporting party send a transmission comprising a report to the report receiving party, the report comprising information on whether or not data blocks have been received successfully,
letting the reporting party send the report together with data which it wishes to send to the report receiving party or to another party in the cell. This is thus the "piggy backing" of reports with data that has been mentioned previously in this text.
letting the reporting party attach addresses for the recipient of the data blocks and for the report in the transmission.

According to the method of the invention, the reporting party decides the contents of the report using at least one of the following priority rules which have been given an internal priority ranking:
Data blocks which are identified as having a lower delay tolerance than other data blocks are given priority,
Data blocks which have been detected as received in error, and whose status has not been reported since the error was detected are given priority,
Data blocks are given priority according to their sequence numbers, with lower sequence numbers having priority over data blocks with higher sequence numbers.

The invention also discloses a transceiver such as a User Equipment or a Radio Base Station for use in a cellular access system which works according to the principles described above.

BRIEF DESCRIPTION OF THE DRAWINGS

The invention will be described in more detail in the following, with reference to the appended drawings, in which.

DETAILED DESCRIPTION

The invention will be described further in the following, using examples of preferred embodiments and with referring to the appended drawings. Reference will sometimes be made to particular standards and nomenclature from known systems, such as the EDGE standard or the GSM system. Such references are only made to provide clear and concrete examples and are not to be viewed as limiting. The man skilled in the field will realize that the invention can equally well be applied to a wide range of cellular access systems which use functions similar to those shown in the embodiments below, although different terminologies may be used in other systems.

For example, a node in a cellular access system will be shown below and referred to as a Radio Base Station, RBS. In some systems, essentially the same function as that of an RBS is performed by a node known as Node B or sometimes "eNodeB". Likewise, the node referred to in the examples below as UE, User Equipment, are sometimes in other systems referred to as MS, Mobile Stations.

Figure 1:
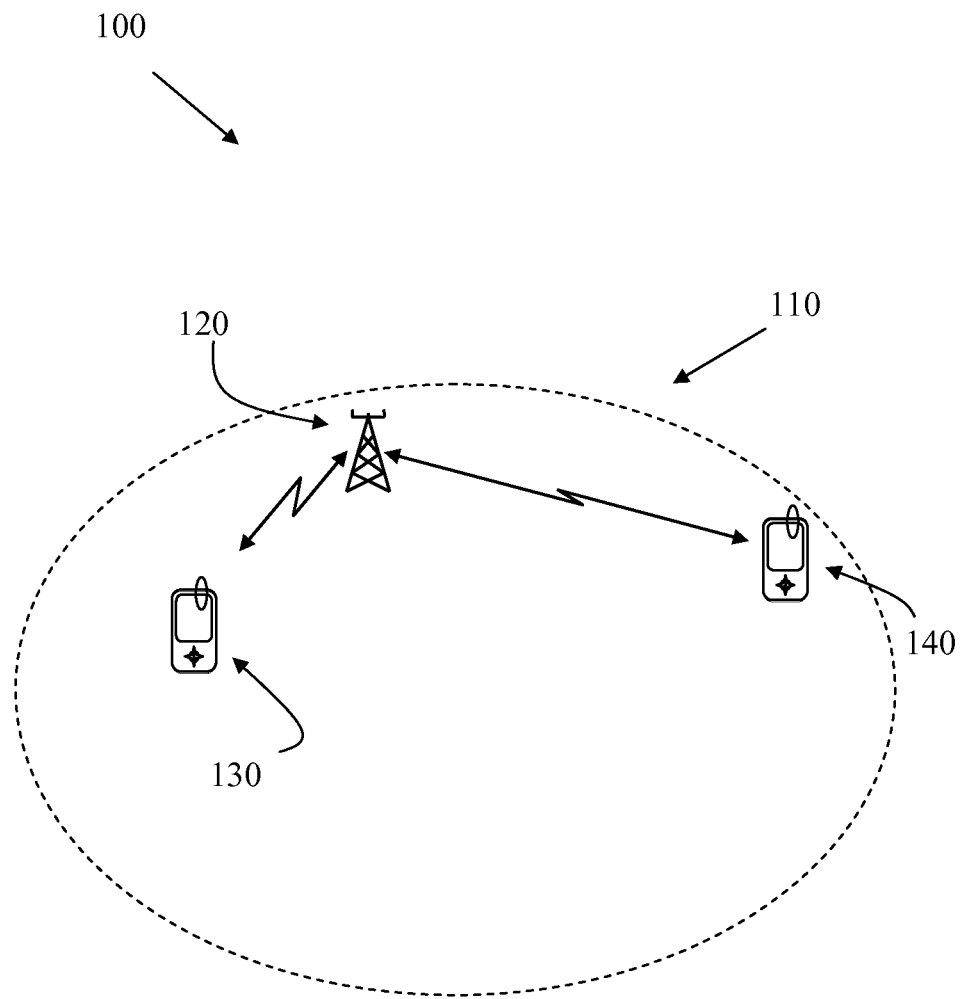
FIG. 1 shows an example of a system in which the invention may be applied.

Thus, with reference to FIG. 1, a cellular access system 100 is shown in which the invention may be applied. As seen in FIG. 1, the system 100 comprises a Radio Base Station, an RBS 120, which controls the traffic to and from a cell 110 in the system 100.

In the cell 110 there can be a user with a User Equipment, UE 130, 140. The RBS 120 and the UE 130, 140, are able to send and receive data in blocks to and from each other. The data which is sent between the RBS and the UE may comprise sequence numbers, which aid in identifying the data blocks.

As explained above, the invention is primarily intended to provide a new reporting strategy for ACK/NACK reports, which can be used together with "event based" reporting of ACK/NACK, especially if the ACK/NACK reports are "piggy backed" ("PAN") on data sent from the reporting party to the other party, i.e. the "report receiving party", which is the party that sent the data that the report refers to. The invention can be applied either to the acknowledged or to the non persistent RLC mode, which have been explained above, and the invention describes which parts of the RLC transmission window that should be covered by the PANs for those modes.

In an alternative embodiment of the invention, an ACK/NACK report can be "piggy backed" to a data transmission which is addressed to, or intended for, a party in the system which is not the report receiving party. This embodiment will be elaborated upon more lately in this text.

As explained above, both the RBS 120 and the UE 130, 140 can be either the reporting or the report receiving party. Thus, in the continued description below, reference will be made not to the RBS or the UE, since either of those can have either role in the system. Reference will instead be made to "the reporting party" or the "report receiving party", or words which are essentially synonyms of those words.

According to the present embodiment of the invention, the reporting party sends an ACK/NACK report to the report receiving party, and thus lets the report comprise information on whether or not data blocks which were transmitted by the report receiving party were received successfully. Also, according to this embodiment of the invention, the reporting party sends the ACK/NACK report together with data which it, i.e. the reporting party, needs to transmit to the report receiving party, i.e. the party which transmitted the data that the ACK/NACK-report concerns.

Also, according to the invention, the reporting party which has thus received data from the report receiving party may decide the contents of the ACK/NACK report using at least one of a number of priority rules which will be described in the following. However, it should also be explained that according to the invention, the reporting party or the system as such needs to make a ranking of the priority rules, i.e. a rule which enables the reporting party to decide which of the rules is the most important if there is a conflict between two or more of the rules explained below. This ranking can be done either once and for all, for example when installing or setting up the system, or the ranking can be done adaptively, either at regular intervals in time or each time that a report is to be sent.

According to the invention, as opposed to previous methods for ACK/NACK-reporting in GERAN, the ACK/NACK reporting can be controlled by the UE as well. However, the idea will in the following be described with reference to a reporting party, since the idea behind the invention can also be used by the RBS when sending ACK/NACK reports to the UE.

If the UE is the reporting party, there is also a possibility for the network to send a poll for a PAN report to the UEs via the RBS.

Turning now to the priority rules, the following priority rules are comprised in the invention:

Data blocks which are identified as having a lower delay tolerance than other data blocks are given priority. Thus, data blocks that belong to a TBF, Temporary Block Flow, with lower delay tolerance will have higher priority.

Data blocks which have been detected as having been received in error, and whose status has not been reported since the error was detected are given priority. This will ensure that transmission errors are reported as fast as possible, and that transmission delays can be kept to a minimum.

Data blocks are given priority according to their sequence numbers, with lower sequence numbers having priority over data blocks with higher sequence numbers. Thus, data blocks with lower Block Sequence numbers, BSN, will have higher priority, which will prioritize data blocks that have been in the system for a long time, which in turn will keep the delay jitter down.

The priority rules can also change depending on whether or not there has been a poll, usually from the RBS to the UE. For example, data blocks that belong to a TBF, Temporary Block Flow, that has been polled could be given top priority. Another way of adapting the priorities would be to give data block with lowest BSN from a polled TBF top priority. With that rule, a PAN poll would be similar to a FPB poll, First Partial Bitmap, which gives the base station ACK/NACK information of the beginning of the reception window in the UE.

The priority rules can also be used to decide the size of the PAN. For example, it could be decided that the PAN should be sufficiently large to cover all data blocks that are covered by one or more of the priority rules of the invention.

In order to enable a reporting party to report errors that are far apart in time, or that belong to different TBFs, a multi segment PAN with several Starting Sequence Numbers, SSN, is needed. If the PAN has its own channel coding in the system, the size of the PAN should be predefined or signalled in the header of the message, so that the size is known before the party which receives the PAN starts to decode it. As an option, a flag (consisting of one or more bits) in the message can be used to signal the presence or absence of a PAN in the transmission or message, and if there is a PAN included in the transmission or message, the receiving party can try to decode the PAN, with attempts being made for a number of different but known alternative PAN sizes.

The structure of the PAN, i.e. the number of segments and the relative size of the segments, could also be signalled in the message header, as an alternative to which, in order to save space in the header, a specific structure field in the beginning of the PAN could be used. This structure field will then comprise information on which of one or more predefined PAN structures that is used. The size and interpretation of the structure field could vary depending on the size of the PAN.

A decision on whether to let the PAN consist of one or more segments should be made by the party which transmits the PAN. A single segment PAN can carry ACK/NACK information for more consecutive BSNs than a two-segment PAN of the same size, but a two-segment PAN can cover a larger range of BSNs. The method proposed by the invention is to test both these types of PAN, and to evaluate which type that fulfils the priority rules best and contains the largest amount of erroneous blocks.

Some examples of embodiments of the invention will now be given, in order to facilitate the reader's understanding of the invention.

In GERAN, GSM EDGE Radio Access Network, an ACK/NACK reporting scheme according to the invention could be included using PANs and the reporting strategy shown below.

The example below will use a UE as the reporting party, but those skilled in the field will realize that the method described below could also be applied to an RBS with the proper modifications.

A UE 130, 140 will send a PAN if polled for it by the RBS 120, or if it detects an erroneous transmission. This PAN has one of two or three predefined sizes, the size being signalled in the header, as described above. If a large PAN size is used, the PAN starts with a structure bit, defining if one or two segments are used.

It is then decided by deciding means in the UE which data blocks that will be covered by the PAN, using the following priority order:

1. TBFs, Temporary Block Flows, which have received a forced PAN poll, i.e. a poll where the response to the poll, the ACK/NACK information, is allowed to be piggybacked in a PAN.

The beginning of the transmission window, i.e. the lowest BSN, will be covered by the PAN.

2. Unreported transmission errors of TBFs in non-persistent mode, NPM.

The NPM TBF with the lowest delay tolerance (e.g. lowest setting of NPM transfer time) will be selected first.

For the selected NPM TBF, unreported new errors with the lowest BSN number should be selected first.

Repeat until there are no more new unreported errors.

3. Unreported transmission errors of TBFs in acknowledged mode, ACKM.

For the selected ACKM TBF, the unreported new errors with the lowest BSN number, i.e. the oldest outstanding block, will be selected first.

Repeat until there are no more new unreported errors.

4. Other outstanding data blocks of TBFs in non-persistent mode

TBF with lowest delay tolerance (NPM transfer time) first.

For the selected NPM TBF, other outstanding blocks with the lowest BSN number should be selected first.

5. Other outstanding data blocks of TBFs in acknowledged mode

For the selected ACKM TBF, unreported new errors with lowest BSN number, i.e. the oldest outstanding block, should be selected first.

For acknowledge mode, it should be noted that item 3, acknowledged mode RLC, will make sure to encapsulate the BSN causing the event in the PAN. In the case of a multi-segment PAN, if there are more new unreported errors than can fit into the first segment then, for example, the second segment will continue to be filled with the remaining new unreported errors.

If on the other hand, all new unreported errors fit into the first segment, then item 4 will enforce that the second segment covers the beginning of the reception window and effectively work as a First Partial Bitmap, FPB, which can, for example, help to prevent stalling.

If it is not possible to fit all new unreported errors in the PAN, even if the maximum PAN size is used, a new event will be generated by the UE to send a new PAN the next time this is possible.

A First Example

Using the strategy outlined in connection with items 1-5 above, the following could be an application of the invention, using one segment PANs in acknowledged mode:

In the acknowledged RLC mode, assume that data blocks 16 and 18 contain unreported new errors, and that the total error data blocks (i.e. outstanding blocks) are blocks 4, 7, 16 and 18. All other blocks up to, and including 20, are assumed to have been received correctly. Assume further that the system allows for one-segment PANs only, and that the PAN is designed so that it may have a bitmap, 'BSN_MAP', of 4 bits, where each bit represents one radio block, and a bit value of 1 means correct reception of the radio block, and a bit value of 0 means that the radio block has not been correctly received. There may also be a starting sequence number, an SSN that specifies one radio block that is not correctly received and which gives the starting point of the bitmap "BSN_MAP".

According to the strategy proposed by the invention, a PAN would then be produced with the following characteristics:
SSN=16, BSN_MAP=1011, which covers BSNs 17-20.

In the same situation, FPB, on the other hand, would have produced a PAN as follows: SSN=4, BSN_MAP=1101, which covers BSNs 5-8.

It should also be pointed out here that it would take a while before FPB will start covering the erroneous BSNs 16 and 18, which in turn will increase the retransmission delay compared to the strategy proposed by the invention, the event based bitmap, EBB.

A Second Example

Using the strategy outlined in connection with items 1-5 above, the following could be another application of the invention, in which one or two segment PANs would be allowed:

Assume again a system which operates in acknowledged RLC mode, and that the unreported new errors are in data blocks 16 and 18. Assume now, however, that the total amount of data blocks that have not been correctly received are blocks 4, 7, 11, 12, 16 and 18. All other blocks up to, and including 20, are assumed to have been received correctly Assume further that the system in this example will allow for a two-segment PAN, and that this PAN is designed so that it may have two BSN_MAP bitmaps of 4 bits each.

The reporting strategy of the invention, the EBB, would in this example produce a PAN with the following characteristics:
First segment: SSN=16, BSN_MAP=1011 (covers BSNs 17-20) Second segment: SSN=4, BSN_MAP=1101 (covers BSNs 5-8)

The FPB strategy, on the other hand, would have produced a PAN with the following characteristics:
First segment: SSN=4, BSN_MAP=1101 (covers BSNs 5-8) Second segment: SSN=11, BSN_MAP=0111 (covers BSNs 12-15)

Again, the event based strategy of the invention, EBB, will request a retransmission of blocks 16 and 18 before the FPB strategy does so, which will lower the RLC block delay. In addition, the EBB strategy still covers the beginning of the transmit window, in similarity to FPB.

Figure 2:
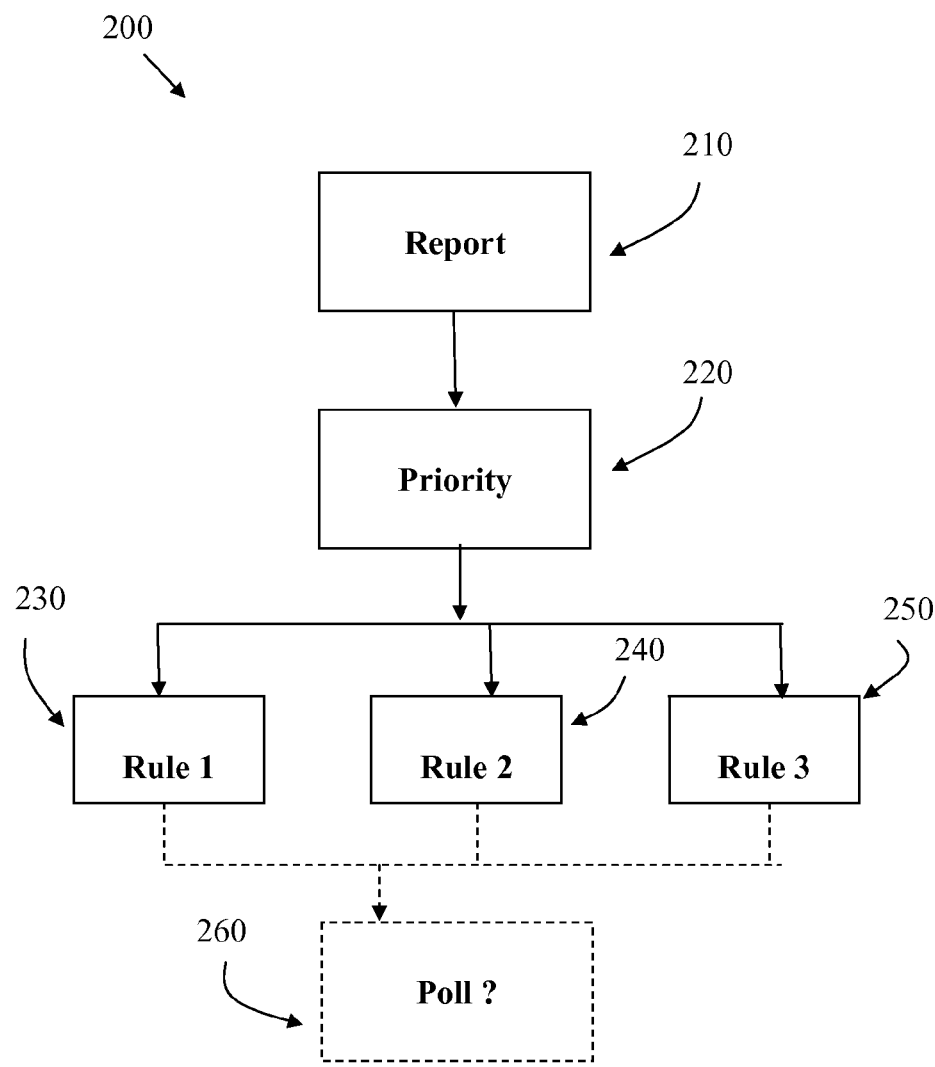
FIG. 2 shows a flow chart of some steps of the invention.

In summary, FIG. 2 shows a brief flow chart 200 with some of the steps of a method of the invention: In step 210, the reporting party sends a transmission comprising a report to the report receiving party, the report comprising information on whether or not data blocks which were transmitted by the report receiving party were received successfully, and the report is sent together with data from the reporting party to the report receiving party, or as mentioned previously, to another party in the cell. The reporting party attaches addresses for the recipient of the data blocks and for the report in the transmission.

In addition, in step 220, the reporting party decides the contents of the report using at least one of the following priority rules, steps 230-250, which have been given an internal priority ranking:

Data blocks which are identified as having a lower delay tolerance than other data blocks are given priority, step 230, Data blocks which have been detected as received in error, and whose status has not been reported since the error was detected are given priority, step 240, Data blocks are given priority according to their sequence numbers, with lower sequence numbers having priority over data blocks with higher sequence numbers, step 250.

Indicated in step 260 with dashed lines to show that it is an optional step, if the UE, 130, 140, is the reporting party, the report 210 is triggered by a request, i.e. a poll, from the RBS 120.

Figure 3:
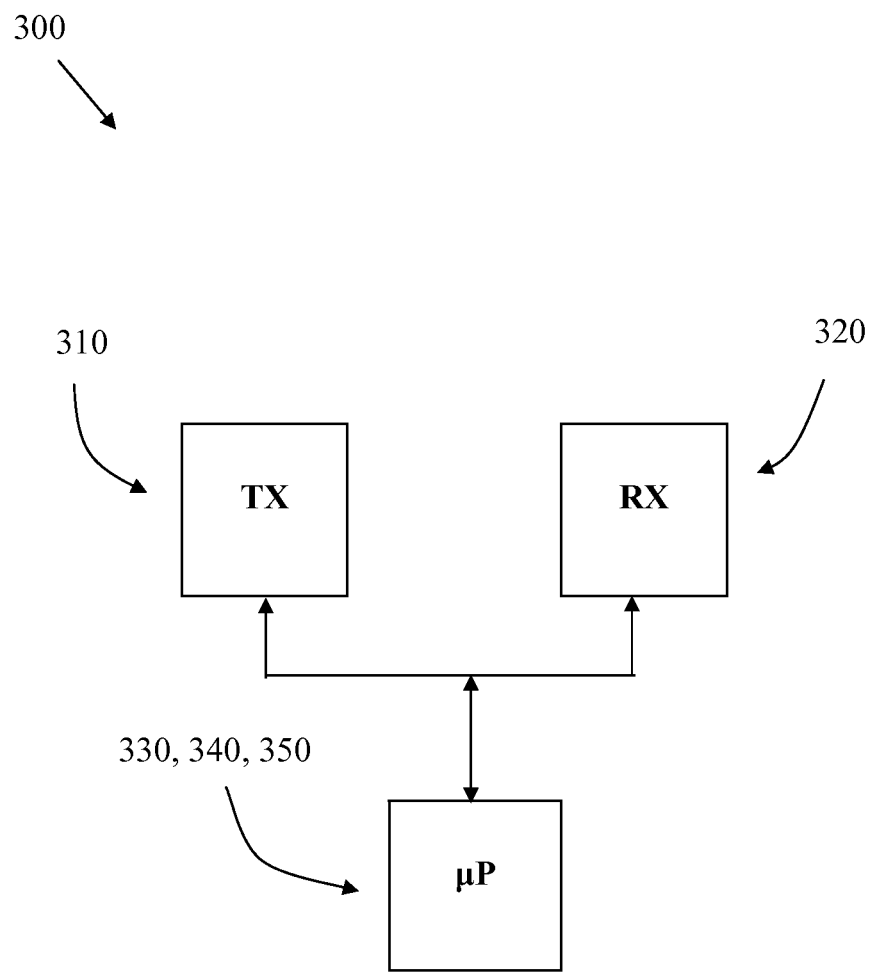
FIG. 3 shows a transceiver of the invention.

FIG. 3 shows a rough block diagram of a transceiver 300 of the invention, the transceiver being either a UE or an RBS in the system 100 described above. The transceiver 300 comprises means 310, for sending and means 320 for receiving data blocks, which may comprise sequence numbers, to and from a second transceiver in the system, so that the transceiver 300 can be either a reporting or a report receiving party with respect to the second transceiver.

The transceiver 300 comprises means 330 for sending a report, when the first transceiver is the reporting party, to the report receiving party, the report comprising information on whether or not data blocks which were transmitted by the report receiving party were received successfully, and also comprises means 340 for sending said report together with data to the report receiving party. The means 330 and 340 may be one and the same, for example a microprocessor or some other controlling device, as shown in FIG. 3, which controls and coordinates the transmitter 310 and the receiver 320.

The transceiver 300 also comprises means 350 for deciding the contents of the report using at least one of the priority rules described above. These means 350 may also be embodied by the processor or controller mentioned previously.

The invention is not limited to the examples of embodiments described above and shown in the drawings, but may be freely varied within the scope of the appended claims. For example, as mentioned previously in this text, the reporting party can send the ACK/NACK report together with data to the report receiving party or to another party in the cell.

Thus, for example, an RBS may broadcast a message which comprises data intended for one UE in the cell together with an ACK/NACK report (a "PAN") which is intended for another UE in the cell. Since the message is a "broadcast" message, both of the UEs will receive the message, and since the RBS includes addresses both for the recipient of the data and for the recipient of the ACK/NACK report in the transmission, both of the UEs will extract only that part of the transmission or message which is intended for them. For example, a typical message according to the invention will comprise a data part and a "report part", i.e. a PAN part. The message will also include an address for the data, as well as an address for the PAN.

The address for the PAN may be designed in a number of ways. One way is to let a message comprise explicit addresses both for the data and for the PAN, another way is to let the message comprise a flag (one or more bits) which signals the presence or absence of a PAN in the message, and to let the PAN as such comprise the address for which it is intended. An alternative way, as described previously in this text is to use a flag to signal the absence or presence of a PAN in the message, and to then let the report receiving party try different PAN sizes.

The invention claimed is:

1. A method in a first transceiver for use in a cellular access system, wherein the first transceiver sends and receives data blocks to and from a second transceiver in the cellular access system, the first transceiver being a reporting party with respect to the second transceiver, the method comprising:
    sending a transmission comprising a report to the report receiving party, said report comprising information on whether or not data blocks have been received successfully,
    wherein said report is sent together with data to the report receiving party or to another party in the cell,
    deciding contents of the report using at least one of the following priority rules which have been given a priority ranking:
    data blocks which are identified as having a lower delay tolerance than other data blocks are given priority;
    data blocks which have been detected as received in error, and whose status has not been reported since the error was detected are given priority;
    and data blocks are given priority according to their sequence numbers, with lower sequence numbers having priority over data blocks with higher sequence numbers.

2. The method of claim 1, according to which, when the first transceiver is comprised in a user equipment (UE), the report is triggered by a request from the second transceiver being comprised in a radio base station (RBS).

3. The method of claim 2, according to which, when there has been a poll from the RBS to the UE, priority is given by the UE to data blocks which have been identified as belonging to a group of data blocks which the poll referred to.

4. The method of claim 3, according to which priority is given to data blocks in said group which have the lowest sequence number.

5. The method claim 1, according to which, the number of data blocks covered by the report is such that all data blocks which are covered by one of said priority rules are included in the report.

6. The method claim 1, according to which the report comprises a header which indicates the size of the report.

7. A user equipment for use in a cellular access system, the user equipment configured for sending and for receiving data blocks to and from a radio base station in the cellular access system, the user equipment being a reporting party with respect to the radio base station, the user equipment comprising:
    a transceiver configured to send a transmission comprising a report, to the radio base station, said report comprising information on whether or not data blocks have been received successfully at the user equipment,
    the transceiver further configured to send said report together with data to the radio base station or to another party in the cell, and
    a processor configured to determine the contents of the report using at least one of the following priority rules which have been given a priority ranking:
    data blocks which have a lower delay tolerance than other data blocks are given priority;
    data blocks which have been detected as received in error, and whose status has not been reported since the error was detected are given priority; and
    data blocks are given priority according to their sequence numbers, with lower sequence numbers having priority over data blocks with higher sequence numbers.

8. The user equipment of claim 7, wherein the user equipment is configured to send the report upon being triggered by a request from the radio base station.

9. The user equipment of claim 8, wherein the user equipment is configured to give, when there has been a poll from the radio base station, priority to data blocks which have been identified as belonging to a group of data blocks which the poll referred to.

10. The user equipment of claim 7, wherein all data blocks which are covered by one of said priority rules are included in the report.

11. The user equipment of claim 7, wherein the report comprises a header which indicates the size of the report.

12. A method in a second transceiver for use in a cellular access system, the second transceiver configured for sending and receiving data blocks to and from a first transceiver in the system, the method comprising:
    receiving a transmission comprising a report, from the first transceiver, said report comprising information on whether or not data blocks have been received successfully at the first transceiver, and
    receiving said report together with data from the first transceiver,
    wherein contents of the report are based on using at least one of the following priority rules which have been given a priority ranking:
    data blocks which have a lower delay tolerance than other data blocks are given priority;
    data blocks which have been detected as received in error, and whose status has not been reported since the error was detected are given priority; and
    data blocks are given priority according to their sequence numbers, with lower sequence numbers having priority over data blocks with higher sequence numbers.

13. A second transceiver for use in a cellular access system, the second transceiver configured for sending and for receiving data blocks to and from a first transceiver in the system, the second transceiver comprising:
    a processor configured to control the second transceiver, the second transceiver being configured to receive a transmission comprising a report, from the first transceiver, said report comprising information on whether or not data blocks have been received successfully at the first transceiver,
    the second transceiver being further configured to receive said report together with data from the first transceiver,
    wherein the contents of the report are based on using at least one of the following priority rules which have been given a priority ranking:
    data blocks which have a lower delay tolerance than other data blocks are given priority;
    data blocks which have been detected as received in error, and whose status has not been reported since the error was detected are given priority; and
    data blocks are given priority according to their sequence numbers, with lower sequence numbers having priority over data blocks with higher sequence numbers.

14. A second transceiver according to claim 13, being comprised in radio base station.

* * * * *

UNITED STATES PATENT AND TRADEMARK OFFICE
CERTIFICATE OF CORRECTION

PATENT NO.       : 9,001,706 B2                                        Page 1 of 1
APPLICATION NO.  : 14/090540
DATED            : April 7, 2015
INVENTOR(S)      : Timner et al.

It is certified that error appears in the above-identified patent and that said Letters Patent is hereby corrected as shown below:

Specification

In Column 1, Line 9, delete "2012," and insert -- 2012, now Patent no. 8,630,210, --, therefor.

In Column 1, Line 13, delete "2007," and insert -- 2007, now Patent no. 8,155,034, --, therefor.

Claims

In Column 10, Line 63, in Claim 14, delete "A second" and insert -- The second --, therefor.

Signed and Sealed this
First Day of December, 2015

Michelle K. Lee
*Director of the United States Patent and Trademark Office*